(12) United States Patent
Fujita

(10) Patent No.: US 8,268,460 B2
(45) Date of Patent: Sep. 18, 2012

(54) HIGH HEAT RESISTANT MASTERBATCH, HEAT RAY SHIELDING TRANSPARENT MOLDED RESIN, AND HEAT-RAY SHIELDING TRANSPARENT LAMINATION BODY

(75) Inventor: Kenichi Fujita, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 48 days.

(21) Appl. No.: 12/734,327

(22) PCT Filed: Oct. 25, 2007

(86) PCT No.: PCT/JP2007/070845
§ 371 (c)(1),
(2), (4) Date: Jun. 25, 2010

(87) PCT Pub. No.: WO2009/054060
PCT Pub. Date: Apr. 30, 2009

(65) Prior Publication Data
US 2010/0261037 A1    Oct. 14, 2010

(51) Int. Cl.
*B32B 27/00* (2006.01)
*C08K 3/10* (2006.01)
*C08K 3/22* (2006.01)
(52) U.S. Cl. ......... 428/702; 523/135; 524/406; 524/558
(58) Field of Classification Search .................... 524/406
See application file for complete search history.

(56) References Cited

U.S. PATENT DOCUMENTS

| 5,190,700 | A | 3/1993 | Watanabe et al. |
| 2004/0028920 | A1 | 2/2004 | Fujita et al. |
| 2006/0008640 | A1 | 1/2006 | Chonan et al. |
| 2006/0178254 | A1 * | 8/2006 | Takeda et al. ..................... 501/1 |

FOREIGN PATENT DOCUMENTS

| EP | 1 676 890 A1 | 7/2006 |
| EP | 2 143 762 A1 | 1/2010 |
| EP | 2 213 490 A1 | 8/2010 |
| JP | A-01-308442 | 12/1989 |
| JP | A-02-173060 | 7/1990 |
| JP | A-05-078544 | 3/1993 |
| JP | A-06-184520 | 7/1994 |
| JP | A-06-256541 | 9/1994 |
| JP | A-06-264050 | 9/1994 |
| JP | A-08-109365 | 4/1996 |
| JP | A-08-127764 | 5/1996 |
| JP | A-2000-160001 | 6/2000 |
| JP | A-2003-327717 | 11/2003 |
| JP | A-2004-059875 | 2/2004 |
| WO | WO 2005/087680 A1 | 9/2005 |

OTHER PUBLICATIONS

International Search Report issued in Application No. PCT/JP2007/070845; Mailed on Dec. 11, 2007 (With Translation).
International Preliminary Report on Patentability issued in Application No. PCT/JP2007/070845; Dated Jun. 1, 2010.
European Search Report issued in Application No. 07830579.4; Dated Sep. 21, 2011.

* cited by examiner

*Primary Examiner* — David W Wu
*Assistant Examiner* — Vu A Nguyen
(74) *Attorney, Agent, or Firm* — Oliff & Berridge, PLC

(57) ABSTRACT

To provide a transparent resin molded product with less yellowing due to thermal deterioration of a dispersant by melting and kneading during molding process, and having excellent visible light transmittance and excellent heat ray shielding function. Then, a high heat resistant masterbatch is provided, which is used for manufacturing a heat ray shielding transparent molded resin, comprising: a thermoplastic resin; composite tungsten oxide particles expressed by a general formula $WO_X$ (satisfying $2.45 \leq X \leq 2.999$) and/or composite tungsten oxide particles expressed by a general formula $M_YWO_Z$ (satisfying $0.1 \leq Y \leq 0.5$, $2.2 \leq Z$ 3.0) and having a crystal structure of hexagonal crystal; and a high heat resistant dispersant having a thermal decomposition temperature of 230° C. or more, satisfying a range of $10 \geq$ [weight of the high heat resistant dispersant/(weights of tungsten oxide particles and/or composite tungsten oxide particles)] $\geq 0.5$.

6 Claims, No Drawings

HIGH HEAT RESISTANT MASTERBATCH, HEAT RAY SHIELDING TRANSPARENT MOLDED RESIN, AND HEAT-RAY SHIELDING TRANSPARENT LAMINATION BODY

BACKGROUND

1. Technical Field

The present invention relates to a high heat resistant masterbatch used for manufacturing a heat ray shielding molded product utilized in roof materials and wall materials of buildings, and window materials used in opening parts of automobiles, trains, and airplanes, and arcades, ceiling domes, and carports, and relates to a heat ray shielding transparent molded resin and a heat ray shielding transparent lamination body, to which the masterbatch is applied.

2. Description of Related Art

Ultraviolet ray and infrared ray are included in solar beams incident from a so-called opening part such as a window and a door of each kind of buildings. Near infrared ray with a wave length from 800 to 2500 nm out of such an infrared ray included in the solar beams is called a heat ray, thereby causing an increase of a temperature in a room by invading thereinto from the opening part. In order to solve such a temperature rise, in recent years, a demand for a heat ray shielding molded product capable of shielding the heat ray while sufficiently taking-in a visible light, and inhibiting the temperature rise in a room while retaining brightness, has been rapidly increased.

For example, there is proposed a heat ray shielding plate with a heat ray reflecting film having metal or metal oxide vapor-deposited on a transparent resin film, is adhered to a transparent molded product such as glass, acrylic plate, and a polycarbonate plate, etc. However, such a heat ray reflecting film itself is extremely expensive and a complicated step such as an adhesion step is required, thus increasing a cost. Further, adhesiveness between the transparent molded product and the reflecting film is poor, thus involving a problem that peel-off of the film occurs by aging.

There are proposed a plurality of heat ray shielding plates with metal or metal oxide directly vapor-deposited on a surface of the transparent molded product. However, in manufacturing the heat ray shielding plate, it is necessary to use an apparatus requiring high vacuum and high precision, thus involving a problem of low mass-productivity and poor universal usability.

In addition, there is proposed a heat ray shielding plate and a film with an organic near infrared ray absorbent represented by a phthalocyanine-based compound and an anthraquinone-based compound kneaded into a thermoplastic transparent resin such as polyethylene terephthalate resin, polycarbonate resin, acrylic resin, polyethylene resin, and polystyrene resin (see patent documents 1 and 2).

Further, there is also proposed a heat ray shielding plate with inorganic particles such as titanium oxide having a heat ray reflectivity or mica coated with titanium oxide being kneaded into a transparent resin such as acrylic resin or polycarbonate resin, as heat ray reflecting particles (see patent documents 3 and 4).

Meanwhile, inventors of the present invention focus on hexaboride particles having large amounts of free electrons, as components having a heat ray shielding effect. Accordingly, there is proposed a heat ray shielding resin sheet material with hexaboride particles dispersed into polycarbonate resin or acrylic resin, or the hexaboride particles and ITO particles and/or ATO particles dispersed into the polycarbonate resin or acrylic resin (see patent document 5). As optical characteristics of the heat ray shielding resin sheet material with the hexaboride particles singularly dispersed or the hexaboride particles and ITO particles and/or ATO particles dispersed into the polycarbonate resin or the acrylic resin, the heat ray shielding resin sheet material has maximum of a visible light transmittance in a visible light region, and minimum of a solar transmittance by exhibiting strong absorption in the near infrared region. As a result, the visible light transmittance is improved to 70% or more and the solar transmittance is improved to 50% or more.

Further, in patent document 6, the inventors of the present invention propose the masterbatch mainly composed of thermoplastic resin and heat ray shielding component hexaboride ($XB_6$, wherein X is at least one kind or more selected from La, Ce, Pr, Nd, Gd, Tb, Dy, Ho, Y, Sm, Eu, Er, Tm, Yb, Lu, Sr, and Ca), and a heat ray shielding transparent molded resin and a heat ray shielding transparent lamination body, to which the masterbatch is applied. Then, owing to such an application of the masterbatch, the heat ray shielding transparent molded resin with various shapes having a high heat ray shielding function while retaining an excellent visible light transmitting ability can be manufactured by an easy method without using an expensive physical film forming method.

Further, in patent document 7, the inventors of the present invention disclose a technique of manufacturing a laminated structure for shielding solar transmittance with a small haze value and inexpensive production cost by applying tungsten oxide particles expressed by a general formula $WyOz$ (wherein W is tungsten, O is oxygen, satisfying $2.0<z/y\leq3.0$) and/or composite tungsten oxide particles expressed by a general formula $MxWyOz$ (wherein W is tungsten, O is oxygen, satisfying $0.001\leq x/y\leq1$, $2.0<z/y\leq3.0$).

DISCLOSURE OF THE INVENTION

Problem to be Solved by the Invention

Patent document 1: Japanese Patent Laid Open Publication No. 06-256541
Patent document 2: Japanese Patent Laid Open Publication No. 06-264050
Patent document 3: Japanese Patent Laid Open Publication No. 02-173060
Patent document 4: Japanese Patent Laid Open Publication No. 05-78544
Patent document 5: Japanese Patent Laid Open Publication No. 2003-327717
Patent document 6: Japanese Patent Laid Open Publication No. 2004-59875
Patent document 7: International Publication No. WO2005/87680A1.

However, according to an examination by the inventors of the present invention, a large amount of near infrared ray absorbent needs to be mixed in the heat ray shielding plate and the film according to patent documents 1 and 2, for sufficiently shielding the heat ray. However, when the large amount of the near infrared ray absorbent is mixed, there is a problem that a visible light transmitting ability is deteriorated this time. Further, since an organic compound is used as the near infrared ray absorbent, weather resistance property is hardly exhibited even when such heat ray shielding plate and film are applied to window materials of buildings and vehicles which are always directly exposed to solar light, and are not appropriate.

Further, in the heat ray shielding plate according to patent documents 3 and 4, a large amount of heat ray reflecting particles needs to be added, to thereby enhance the heat ray shielding ability. However, there is a problem that the visible light transmitting ability is lowered, with an increase of a mixing amount of the heat ray reflecting particles. However, if an addition amount of the heat ray reflecting particles is reduced, there is a problem that the heat ray shielding ability is decreased this time, despite the visible light transmitting ability is increased, and the heat ray shielding ability and the visible light transmitting ability are hardly satisfied simultaneously. Further, when a large amount of heat ray reflecting particles is mixed, there is also a problem from an aspect of strength, such that physical characteristics of the transparent resin, particularly impact resistance and toughness are deteriorated.

Further, heat ray shielding sheet materials according to patent documents 5 to 7 leave room for improvement in heat ray shielding characteristics, and in such a heat ray shielding sheet material, an initial transparent resin sheet is turned yellow in some cases.

In view of the above-described problem, the present invention is provided, and regarding a heat ray shielding transparent molded resin with various shapes having a visible light transmitting ability and a heat ray shielding function, an object of the present invention is to provide a masterbatch which can be manufactured by a simple method without using an expensive physical film forming method, and which is not turned yellow, and which is used for the heat ray shielding transparent molded resin capable of obtaining a transparent molded resin having excellent visible light transmittance and excellent heat ray shielding function, and also provide a heat ray shielding transparent molded resin and a heat ray shielding transparent lamination body to which the masterbatch is applied.

Means for Solving the Problem

In order to solve the above-described problem, as a result of strenuous study by the inventors of the present invention, it is found that in the manufactured heat ray shielding sheet material, the expected visible light transmitting ability and heat ray shielding function can not be obtained and the heat ray shielding sheet material is turned yellow, and this is caused by thermal denaturation of the dispersant contained in the masterbatch. Namely, since heat resistance property of the dispersant contained in the masterbatch is low, the dispersant is denaturized when the masterbatch is kneaded/mixed into the same kind or different kind of resin while being heated, thus deteriorating a dispersion ability of the dispersant and interfering with dispersion of the heat ray shielding particles contained in the masterbatch, and the expected visible light transmitting ability and the heat ray shielding function can not be obtained. Further, the denaturized dispersant is colored yellow to brown, and the heat ray shielding sheet material is thereby caused to turn yellow.

As a result of further study based on the above-described knowledge, the inventors of the present invention achieve a high heat resistant masterbatch with a mixing ratio of the dispersant and the heat ray shielding particles controlled in a prescribed range, by using a high heat resistant dispersant having a thermal decomposition temperature of 230° C. or more. Then, it is found that by diluting and kneading the high heat resistant masterbatch by a thermoplastic resin, and molding it into arbitrary shapes such as plate shape, film shape, and spherical shape by an extrusion molding, an injection molding, and a compression molding, the heat ray shielding transparent molded resin and the heat ray shielding transparent lamination body having a transmittance maximum in a visible light region and not turning yellow while having a strong absorption in the near infrared region can be manufactured. The present invention is completed based on such a technical discovery.

Namely, a first structure of the present invention is a high heat resistant masterbatch, which is used for manufacturing a heat ray shielding transparent molded resin, including:

a thermoplastic resin;

composite tungsten oxide particles expressed by a general formula $WO_X$ (satisfying $2.45 \leq X \leq 2.999$) and/or composite tungsten oxide particles expressed by a general formula $M_Y WO_Z$ (satisfying $0.1 \leq Y \leq 0.5$, $2.2 \leq Z \leq 3.0$) and having a crystal structure of hexagonal crystal; and a high heat resistant dispersant having a thermal decomposition temperature of 230° C. or more, satisfying a range of $10 \geq$ [weight of the high heat resistant dispersant/(weights of tungsten oxide particles and/or composite tungsten oxide particles)] $\geq 0.5$.

A second structure is the high heat resistant masterbatch according to the first structure, wherein the high resistant dispersant has an acryl main chain, a hydroxyl group, or an epoxy group.

A third structure is the high heat resistant masterbatch according to the first structure or the second structure, wherein element M contained in the composite tungsten oxide particles is at least one kind or more selected from Cs, Rb, K, Tl, In, Ba, Li, Ca, Sr, Fe, Sn, Al, and Cu.

A fourth structure is the high heat resistant masterbatch according to anyone of the first to the third structures, wherein the thermoplastic resin is at least one kind or more selected from acrylic resin, polycarbonate resin, polystyrene resin, polyethersulfone resin, fluorine based resin, polyolefin resin, and polyester resin.

A fifth structure is the high heat resistant masterbatch according to any one of the first to fourth structures, wherein the tungsten oxide particles and the composite tungsten oxide particles are particles, each having a dispersion particle diameter of 200 nm or less.

A sixth structure is the high heat resistant masterbatch according to any one of the first to fifth structures, wherein the tungsten oxide particles and the composite tungsten oxide particles are subjected to surface treatment by a compound of at lest one kind ore more selected from a silane compound, a titanium compound, and a zirconia compound.

A seventh structure is the high heat resistant masterbatch, wherein the high heat resistant masterbatch according to any one of the first to sixth structures is mixed with the same kind of thermoplastic resin as the thermoplastic resin contained in the high heat resistant masterbatch, or a different kind of thermoplastic resin having compatibility with the thermoplastic resin contained in the high heat resistant masterbatch, and is molded into a prescribed shape.

An eighth structure is a heat ray shielding transparent lamination body, wherein the heat ray shielding transparent molded resin according to the seventh structure is laminated on other transparent molded product.

Advantage of the Invention

The heat ray shielding transparent resin molded product and the heat ray shielding transparent lamination body having a transmittance maximum in the visible light region and also having strong absorption in the near infrared region, which is not turned yellow, can be manufactured by diluting/kneading the high resistant masterbatch of the present invention by a thermoplastic resin molding material, and further by molding it into arbitrary shapes such as plate shape, film shape, and spherical shape by publicly-known methods such as extrusion molding, injection molding, and compression molding.

DESCRIPTION OF PREFERRED EMBODIMENTS OF THE INVENTION

Preferred embodiments of the present invention will be described in detail hereinafter. A high heat resistant masterbatch for a heat ray shielding transparent molded resin according to this embodiment includes: a thermoplastic resin; tungsten oxide particles expressed by a general formula $WO_X$ (satisfying $2.45 \leq X \leq 2.999$) (code (B1) is added in some cases in this specification) and/or composite tungsten oxide particles expressed by a general formula $M_YWO_Z$ (satisfying $0.1 \leq Y \leq 0.5$, $2.2 \leq Z \leq 3.0$) and having a crystal structure of hexagonal crystal (code (B2) is added in some cases in this specification.); and a high heat resistant dispersant having a thermal decomposition temperature of 230° C. or more, satisfying a range of $10 \geq$ [weight of the high heat resistant dispersant/(weights of tungsten oxide particles and/or composite tungsten oxide particles)] $\geq 0.5$.

Explanation will be given hereafter sequentially for 1) tungsten oxide particles (B1) having a heat ray shielding function, composite tungsten oxide particles (B2), 2) a high heat resistant dispersant (C), 3) a thermoplastic resin (code (A) is added in some cases in this specification), and further 4) a dispersion method of particles having the heat ray shielding function to the thermoplastic resin, 5) a manufacturing method of the heat resistant masterbatch, and lastly 6) a heat ray shielding transparent molded resin.

1) The tungsten oxide particles (B1) and/or the composite tungsten oxide particles (B2)

The tungsten oxide particles (B1) and/or the composite tungsten oxide particles (B2) used as the high heat resistant masterbatch of this embodiment greatly absorb the light in the near infrared region and particularly in the vicinity of a wavelength of 1000 nm, and therefore its translucent color tone is a blue-based color tone in many cases. Further, a particle diameter of the heat ray shielding material can be selected suitably depending on the purpose of use.

First, when used for an application of retaining transparency, preferably each tungsten oxide particle (B1) and/or composite tungsten oxide particle (B2) has a dispersion particle diameter of 800 nm or less. This is because in a case of the dispersion particle diameter smaller than 800 nm, light is not completely shielded by scattering, then visibility of the visible light region is retained, and simultaneously transparency can be efficiently retained. Particularly, when the transparency of the visible light region is emphasized, scattering by particles is further preferably taken into consideration.

Moreover, when reduction of the scattering by particles is emphasized, the dispersion particle diameter of the tungsten oxide particle (B1) and/or the composite tungsten oxide particle (B2) is preferably set to 200 nm or less and preferably set to 100 nm or less. This is because when the dispersion particle diameter of each dispersion particle is small, the scattering of the light in the visible light region with the wavelength of 400 nm to 780 nm by geometrical scattering and Mie scattering is reduced. As a result of reducing the scattering of the light, it may be possible to avoid a situation that a heat ray shielding film is turned into a smoky glass or the like and a clear transparency can not be obtained. Namely, this is because when the dispersion particle diameter of the dispersion particle is 200 nm or less, the geometrical scattering or the Mie scattering is reduced, and a scattering region is turned into a Rayleigh scattering region. Also, this is because in the Rayleigh scattering region, scattered light is reduced in inverse proportion to sextuplicate of the particle diameter, and therefore scattering is reduced with reduction of the dispersion particle diameter, and the transparency is improved. Further, when the dispersion particle diameter is 100 nm or less, the scattered light is preferably extremely reduced. From the viewpoint of preventing the scattering of light, the dispersion particle diameter is preferably set to be small, and when the dispersion particle diameter is set to 1 nm or more, industrial manufacture is facilitated.

a) Tungsten Oxide Particle (B1)

As the tungsten oxide particle (B1) expressed by the general formula $WO_X$ (satisfying $2.45 \leq X \leq 2.999$), for example, $W_{18}O_{49}$, $W_{20}O_{58}$, $W_4O_{11}$, etc, can be given. When the value of X is set to 2.45 or more, a crystal phase of $WO_2$, being outside a target, is completely prevented from appearing in the heat ray shielding material, and also a chemical stability can be obtained. Meanwhile, when the value of X is set to 2.999 or less, sufficient quantities of free electrons are generated and an efficient heath ray shielding material is achieved. However, 2.95 or less is further preferable as the heat ray shielding material. Here, a $WO_X$-compound with a range of X satisfying $2.45 \leq X \leq 2.999$ is included in a compound called a so-called Magneli phase.

b) Composite Tungsten Oxide Particle (B2)

As the composite tungsten oxide particle expressed by the general formula $M_YWO_Z$ (satisfying $0.1 \leq Y \leq 0.5$, $2.2 \leq Z \leq 3.0$) and having a crystal structure of hexagonal crystal, for example the composite tungsten oxide particles with element M including one kind or more elements selected from Cs, Rb, K, Ti, In, Ba, Li, Ca, Sr, Fe, Sn, Al, and Cu, can be given. Addition amount Y of added element M is preferably 0.1 or more and 0.5 or less, and further preferably is near 0.33. This is because the value theoretically calculated from the crystal structure of hexagonal crystal is 0.33 and preferable optical characteristics can be obtained by the addition amount around 0.33. Further, Z is preferably set in a range of $2.2 \leq z \leq 3.0$. This is because a mechanism similar to that of the tungsten oxide material expressed by $WO_X$ works in the composite tungsten oxide material expressed by $M_YWO_Z$, and in addition, the free electrons are supplied even in a range of $z \leq 3.0$ by adding the element M. However, from the viewpoint of optical characteristics, Z is more preferably set in a range of $2.2 \leq z \leq 2.99$, and further preferably in a range of $2.45 \leq z \leq 2.99$.

Here, as a typical example of the composite tungsten oxide material, $Cs_{0.33}WO_3$, $Rb_{0.33}WO_3$, $K_{0.33}WO_3$, $Ba_{0.33}WO_3$, etc, can be given. However, useful heat ray shielding characteristics can be obtained, as long as Y and Z fall in the aforementioned range.

c) A manufacturing Method of the Tungsten Oxide Particle (B1) and the Composite Tungsten Oxide Particle (B2)

The tungsten oxide particle (B1) and the composite tungsten oxide particle (B2) can be obtained by applying heat treatment to a tungsten compound starting raw material in an inactive gas atmosphere or a reduction gas atmosphere.

The tungsten compound starting raw material is preferably one kind or more selected from tungsten trioxide powders, tungsten dioxide powders, or a tungsten oxide hydrate, or tungsten hexachloride powders, or ammonium tungstate powders or hydrate powders of the tungsten oxide obtained by dissolving the tungsten hexachloride powders into alcohol and thereafter drying it, or the hydrate powders of the tungsten oxide obtained by dissolving the tungsten hexachloride powders into alcohol and thereafter adding water to precipitate the hexachloride powders and drying it, or tungsten compound powders and metal tungsten powders obtained by drying a tungstate ammonium aqueous solution.

Here, when the tungsten oxide particles are manufactured, it is further preferable to use the tungsten compound powders obtained by drying the tungsten oxide hydrate powders, tungsten trioxide powders, or ammonium tungstate aqueous solution. Also, when the composite tungsten oxide particles are manufactured, it is further preferable to use the ammonium tungstate aqueous solution and the tungsten hexachloride solution, from the point that each element whose starting raw material is a solution can be uniformly easily mixtured. These raw materials are used and heat treatment is applied thereto in the inactive gas atmosphere or the reduction gas atmosphere, to thereby obtain the heat ray shielding material particles containing the tungsten oxide particles and/or the composite tungsten oxide particles having the aforementioned particle diameter.

Further, the tungsten compound starting raw material of the heat ray shielding material particles containing the composite tungsten oxide particles (B2) may be the same as the tungsten compound starting raw material of the tungsten oxide particles (B1). However, the element M is further added to the tungsten compound starting raw material in a form of a simple body or a compound of element M, to thereby obtain a starting raw material of the composite tungsten compound.

Here, each raw material is preferably mixed in a form of a solution, to manufacture the starting raw material in which each component is uniformly mixed in a molecular level. Accordingly, preferably the tungsten compound starting raw material containing the element M can be dissolved in a solvent such as water and an organic solvent. For example, tungstate, chloride, nitrate, sulfate, oxalate, oxide, carbonate, and hydrate, etc, can be given. However, the tungsten compound starting raw material is not limited thereto, and may be set in a solution state.

650° C. is preferable as a heat treatment condition in the inactive gas atmosphere. The starting raw material to which the heat treatment is applied at 650° C. or more has excellent efficiency as the heat ray shielding particles having a sufficient near infrared ray absorption ability. Inactive gases such as Ar and $N_2$ can be used as the inactive gas.

Meanwhile, as the heat treatment condition in the reduction atmosphere, first, preferably heat treatment is applied to the starting raw material at 100° C. or more and 650° C. or less in the reduction gas atmosphere, and subsequently heat treatment is applied thereto at 650° C. or more and 1200° C. or less in the inactive gas atmosphere. Although the reduction gas used at this time is not particularly limited, $H_2$ is preferable. Then, when $H_2$ is used as the reduction gas, preferably the composition of the reduction atmosphere is set in a state that 0.1% or more of $H_2$ in a volume ratio is mixed into the inactive gas such as Ar and $N_2$, and further preferably 0.2% or more of $H_2$ is mixed therein. In a case of 0.1% or more of $H_2$ in the volume ratio, reduction can be promoted efficiently.

The raw material powders subjected to heat treatment and reduction in the reduction atmosphere containing $H_2$, includes the magneli phase and shows excellent heat ray shielding characteristics, and can be used as the heat ray shielding particles even in this state. However, preferably hydrogen contained in the tungsten oxide is stabilized, and application thereof is expanded in an aspect of a weather resistance property. Therefore, as described above, further stable heat ray shielding particles can be obtained, by applying heat treatment to a tungsten oxide compound containing hydrogen at 650° C. or more and 1200° C. or less in the inactive atmosphere. The inactive atmosphere during heat treatment of 650° C. or more and 1200° C. or less is not particularly limited. However, from an industrial viewpoint, $N_2$ and Ar are preferable. By the heat treatment of 650° C. or more and 1200° C. or less, the magneli phase can be obtained in the heat ray shielding particles, then hydrogen is stabilized and weather resistance property is improved.

Surface treatment is applied to the tungsten oxide particle (B1) and the composite tungsten oxide particle (B2) exhibiting the heat ray shielding function, by at least one kind or more compounds selected from a silane compound, a titanium compound, and a zirconia compound, and the surface of the particle is coated with oxide containing one kind or more elements selected from Si, Ti, Zr, and Al. This is preferable because the weather resistance property is improved.

Further, in order to obtain a desired heat ray shielding molded resin, it is desirable to set powder colors of the tungsten oxide particle (B1) and the composite tungsten oxide particle (B2) so as to satisfy conditions that L* is 25 to 80, a* is −10 to 10, and b* is −15 to 15, in the powder colors of a L*a*b* color system (JIS Z 8729) recommended by Commission internationale de l'éclairage (CIE).

By using the tungsten oxide particle (B1) and the composite tungsten oxide particle (B2), desired optical characteristics as the heat ray shielding resin sheet material can be obtained.

2) High Heat Resistant Dispersant (C)

Conventionally, dispersants generally used as coating materials are used for the purpose of uniformly dispersing various oxide particles into an organic solvent. However, according to an examination by the inventors of the present invention, such dispersant are not designed based on the estimation that they are used at a high temperature of 200° C. or more. Specifically, in this embodiment, when a conventional dispersant is used in melting and kneading the heat ray shielding particles and the thermoplastic resin, the functional group in the dispersant is decomposed, thus causing a trouble that a resolution power is lowered and the colors of the dispersants are changed from yellow to brown.

Meanwhile, in this embodiment, the high heat resistant dispersant (C) is used, having thermal decomposition temperature set to 230° C. or more or preferably 250° C. or more measured by TG-DTA. As a specific example of the high heat resistant dispersant (C), the dispersant having an acryl main chain as the main chain, and hydrogen group or epoxy group as the functional group, can be given. Preferably, the dispersant with such a structure has a high heat resistant property.

Then, when the thermal decomposition temperature of the dispersant is 230° C. or more, the resolution power of the dispersant is maintained without being decomposed during molding, and the color of the dispersant itself is not changed from yellow to brown. Consequently, as a result of sufficiently dispersing the heat ray shielding particles in the manufactured molded product, the visible light transmittance can be successfully secured and original optical characteristics can be obtained, and also the molded product is not colored yellow. Specifically, in a case of conducting a test of kneading the dispersant of the present invention and polycarbonate resin at a general kneading temperature (290° C.) of polycarbonate, it was confirmed that a kneaded material showed completely the same outer appearance as a case of kneading only polycarbonate, and was clear and colorless and was not colored at all. Meanwhile, for example, in a case of conducting a similar test by using a normal dispersant used in a comparative example 1 as will be described later, it was confirmed that the kneaded material was colored brown.

As described above, the high heat resistant dispersant (C) used in this embodiment has the acryl main chain. However, it is preferable to use the dispersant having the hydrogen group or the epoxy group as the functional group. This is because such a functional group has an effect that it is adsorbed on the surface of each tungsten oxide particle to prevent agglomeration of the tungsten oxide particles and uniformly disperse the tungsten oxide particles in the molded product. Specifically, an acrylic dispersant having the epoxy group as the functional group, and an acrylic dispersant having a hydroxyl group as the functional group, can be given as preferable examples.

Particularly, when the resin having high melting/kneading temperature such as polycarbonate resin and acrylic resin is used as the thermoplastic resin (A), an effect of using the high heat resistant dispersant (C) having the acrylic main chain and the hydroxyl group or the epoxy group, with the thermal decomposition temperature of 250° C. or more, can be remarkably exhibited.

The weight ratio of the high heat resistant dispersant (C), the tungsten oxide particle (B1), and the composite tungsten oxide particle (B2), is preferably set in a range of $10 \geq$ [weight of high heat resistant dispersant/(weight of the tungsten oxide particles and/or the composite tungsten oxide particles)] $\geq 0.5$. This is because when the weight ratio is 0.5 or more, the tungsten oxide particles (B1) and the composite tungsten oxide particles (B2) can be sufficiently dispersed, thus generating no agglomeration of the particles, and sufficient optical characteristics can be obtained. Further, when the weight ratio is 10 or less, mechanical characteristics (flexural strength and surface hardness) of the heat ray shielding transparent molded resin itself are not damaged.

3) Thermoplastic Resin (A)

Next, the thermoplastic resin (A) used in this embodiment is not particularly limited, provided that the thermoplastic resin is transparent and has a high light transmittance in the visible light region. For example, the thermoplastic resin formed into a plate-like molded product with a thickness of 3 mm has preferably the visible light transmittance of 50% or more based on JIS R 3106, and a haze of 305 or less based on JISK7105. Specifically, acrylic resin, polycarbonate resin, polyester resin, polystyrene resin, polyethersulfone resin, fluorine based resin, and polyolefin resin, can be given.

When the heat ray shielding transparent molded resin is intended to be applied to window materials of each kind of building and vehicles, the acrylic resin, polycarbonate resin, polyetherimide resin, and fluorine based resin are more preferable, in consideration of transparency, impact resistance, and weather resistance, etc.

Aromatic polycarbonate is preferable as the polycarbonate resin. As the aromatic polycarbonate, polymer obtained from one or more kinds of divalent phenol-based compounds represented by 2,2-bis(4-hydroxyphenyl)propane, 2,2-bis(3,5-dibromo-4-hydroxyphnyl)propane, and a carbonate precursor represented by phosgene or dipheynyl carbonate, etc, by a publicly-known method such as an interfacial polymerization, a melt polymerization, or a solid phase polymerization, can be given. Further as the acrylic resin, polymer or copolymer can be given, using acrylic ester, vinyl acetate, styrene, acrylonitrile, methacrylonitrile, etc, having an alkyl group of 1-8 carbon numbers as needed, with methyl methacrylate, ethyl methacrylate, propylmethacrylate, and butylmethacrylate, as main raw materials. Further, multiple-polymerized acrylic resin can also be used. Moreover, as the fluorine based resin, polyethylene fluoride, polydiethylene fluoride, polytetraethylene fluoride, ethylene-diethylene fluoride copolymer, ethylene-tetraethylene fluoride copolymer, tetraethylene fluoride-perfluoroalkoxyethylene copolymer, etc, can be given.

4) A dispersion Method of the Particles Having the Heat Ray Shielding Function into the Thermoplastic Resin The dispersion method of the tungsten oxide particles (B1) and/or the composite tungsten oxide particles (B2), being the particles having the heat ray shielding function, into the thermoplastic resin (A) can be arbitrarily selected, provided that the particles can be uniformly dispersed into the resin. For example, first, the method using beads mill, ball mill, sand mill, and ultrasonic wave dispersion, is used to disperse the tungsten oxide particles (B1) and/or the composite tungsten oxide particles (B2) into an arbitrary solvent, to thereby prepare dispersion liquid. Next, the dispersion liquid, the high heat resistant dispersant (C), a particulate material or pellet of the thermoplastic resin (A), and other additive agent as needed, are uniformly melted and mixed while removing the solvent from the dispersion liquid, by using a mixing machine such as ribbon blender, tumbler, NAUTA mixer, Henschel mixer, super mixer, planetary mixer, and a kneading machine such as Banbury mixer, kneader, roll, kneader ruder, a single screw extruder, and twin screw extruder, to thereby prepare a mixture in which the tungsten oxide particles (B1) and/or the composite tungsten oxide particles (B2) are uniformly dispersed into the thermoplastic resin (A). The temperature during kneading is maintained in a temperature of not decomposing the used thermoplastic resin (A).

Further, as other method, the high heat resistant dispersant (C) is added to the dispersion liquid of the tungsten oxide particles (B1) and/or the composite tungsten oxide particles (B2) having the heat ray shielding function, then the solvent is removed by a publicly-known method, and the obtained powders and the particulate material or pellet of the thermoplastic resin (A) and other additive agent as needed, are uniformly melted and mixed, to thereby prepare the mixture in which the tungsten oxide particles (B1) and/or the composite tungsten oxide particles (B2) are uniformly dispersed in the thermoplastic resin (A). In addition, it is also acceptable that powders of the tungsten oxide particles (B1) and the composite tungsten oxide particles (B2) not subjected to dispersion processing, and the high heat resistant dispersant (C) are directly added to the thermoplastic resin (A), so as to be uniformly melted and mixed. The dispersion method is not limited thereto, provided that the tungsten oxide particles (B1) and the composite tungsten oxide particles (B2) are uniformly dispersed into the thermoplastic resin (A).

5) A Manufacturing Method of the High Heat Resistant Masterbatch

The mixture thus obtained is kneaded by a vent-type single screw extruder or twin screw extruder, so as to be processed into a pellet state. Thus, the high heat resistant masterbatch for the heat ray shielding transparent molded resin according to this embodiment can be obtained.

The pellet of the high heat resistant masterbatch can be obtained by a most general method of cutting a melt-extruded strand. Accordingly, a columnar shape or a prismatic shape can be given as the shape of the high heat resistant masterbatch. Further, a so-called hot cut method can also be used for directly cutting a melted and extruded material. In such a case, the high heat resistant masterbatch has the shape close to a spherical shape.

Thus, the high heat resistant masterbatch according to this embodiment can take anyone of the forms or shapes. When the heat ray shielding transparent molded resin is molded, it is preferable to take the same form or shape as those of a thermoplastic molded resin material used in dilution of the high heat resistant masterbatch.

Further, a general additive agent can also be blended into the high heat resistant masterbatch of this embodiment. For example, in order to have an arbitrary color tone as needed, an effective expression level of a dye and a pigment may be blended, such as azo dye, cyanine dye, quinoline dye, perylene dye, and carbon black which are generally used in coloring the thermoplastic resin. Further, the effective expression level of hindered phenolic, or phosphoric stabilizers, a releasing agent, hydroxybenzophenone, salicylic acid, HALS, triazol, triazine based ultraviolet absorber, a coupling agent, a surface active agent, and an antistatic agent, etc, may be blended.

6) Heat Ray Shielding Transparent Molded Resin

Next, the heat ray shielding transparent molded resin of this embodiment can be obtained by diluting/kneading the high heat resistant masterbatch with/into the same kind of thermoplastic resin molded material as the thermoplastic resin of the masterbatch, or a different kind of thermoplastic resin molded material having compatibility with the thermoplastic resin of the masterbatch, and by molding it into a prescribed shape.

There is extremely low thermal deterioration in the heat ray shielding transparent molded resin of this embodiment during molding, by using the high heat resistant masterbatch. Therefore, the heat ray shielding particles such as the tungsten oxide particles (B1) and the composite tungsten oxide particles (B2) are sufficiently dispersed into the heat ray shielding transparent molded resin, and as a result, the visible light transmittance can be successfully secured. Further, there is no color change of the dispersant from yellow to brown, and therefore the molded product is not colored yellow.

The shape of the heat ray shielding transparent molded resin can be molded into an arbitrary shape as needed, and can be molded into BR>A planar shape and a curved shape. Further, the thickness of the heat ray shielding transparent molded resin can be adjusted to an arbitrary thickness as needed from a plate shape to a film shape. Moreover, a resin sheet formed into a planar shape can be molded into an arbitrary shape such as a spherical shape by post-processing.

As a molding method of the heat ray shielding transparent molded resin, an arbitrary method such as extrusion molding, injection molding, compression molding, or rotation molding, can be given. Particularly, a method of obtaining the molded product by the injection molding and a method of obtaining the molded product by the extrusion molding are suitably used. As a method of obtaining the molded product having a plate-shape or a film-shape by the extrusion molding, a method of collecting a molten thermoplastic resin extruded by using the extruder such as a T-die while being cooled by a cooling roll, is used to thereby manufacture the heat ray shielding transparent molded resin.

The aforementioned injection-molded product is suitably used in window glass of automobiles or a vehicle body such as a roof, and the plate-shaped or film shaped molded product thus obtained by extrusion molding, is suitably used in buildings such as arcade or carport.

The heat ray shielding transparent molded resin itself can be used not only in structural materials of the window glass or arcade, etc, but also in the structural material as an integral heat ray shielding transparent lamination body, in such a manner as being laminated on other transparent molded product such as inorganic glass, resin glass, and resin film, by an arbitrary method. For example, the heat ray shielding transparent molded resin molded into a film shape in advance, is integrally laminated on the inorganic glass by a thermal lamination method, to thereby obtain the heat ray shielding transparent lamination body having a heat ray shielding function and a splashing preventive function. Further, simultaneously with molding the heat ray shielding transparent molded resin by a thermal lamination method, a co-extrusion method, a press molding method, or an injection molding method, etc, the molded heat ray shielding transparent molded resin is integrally laminated on other transparent molded product, to thereby obtain the heat ray shielding transparent lamination body. The heat ray shielding transparent lamination body can be used as a useful structural material by complementing mutual defects of the molded products while advantages of the mutual molded products are effectively exhibited.

As described above, by using the high heat resistant masterbatch for the heat ray shielding transparent molded resin of this embodiment wherein the tungsten oxide particles (B1) and the composite tungsten oxide particles (B2) are uniformly dispersed into the thermoplastic resin (A) by using the high heat resistant dispersant (C), the heat ray shielding transparent molded resin and the heat ray shielding transparent lamination body can be provided, having the heat ray shielding function, and having a high transmitting ability in the visible light region, with less yellowing due to a thermal deterioration of the dispersant caused by melting and kneading during molding process.

EXAMPLES

Examples of the present invention will be specifically described hereafter, together with comparative examples. However, the present invention is not limited to the examples described below.

In each example, powder colors (visual field: 10°, light source D65) of the tungsten oxide particles and the composite tungsten oxide particles, the visible light transmittance and the solar transmittance of a heat ray shielding resin sheet material, were measured by using a spectrophotometer U-4000 by Hitachi Ltd. The solar transmittance is an index showing a heat ray shielding performance. Further, a haze value was measured based on JIS K 7105, by using HR-200 by Murakami color research Laboratory.

Example 1

A quartz boat with 50 g of $H_2WO_4$ put therein was set in a quartz tubular furnace, and was heated while 5% of $H_2$ gas was supplied, with $N_2$ gas as a carrier, then subjected to reduction processing for 1 hour at a temperature of 600° C., and thereafter baked for 30 minutes at 800° C. in $N_2$ gas atmosphere, to thereby obtain particle "a". As the powder color of the particle "a", $L^*$ was 36.9288, $a^*$ was 1.2573, $b^*$ was −9.1526, and as a result of identification of a crystal phase by powder X-ray diffraction, the crystal phase of $W_{18}O_{49}$ was observed. Next, 5 wt % of the particle "a", 5 wt % of high heat resistant dispersant a (acrylic dispersant having the hydroxyl group as the functional group, and the thermal decomposition temperature measured by TG-DTA was 250° C.), and 90 wt % of toluene, were weighed, which were then pulverized/dispersed for 6 hours by a paint shaker with $\Phi ZrO_2$ beads put therein, to thereby obtain the tungsten oxide particle dispersion liquid (liquid A). Here, when a dispersion particle diameter of each tungsten oxide particle in the tungsten oxide particles dispersion liquid (liquid A) was measured, the particle diameter was 80 nm. The high heat resistant dispersant α was further added to the liquid A, which was adjusted so that the weight ratio of the high heat resistant dispersant a to the tungsten oxide particles [high heat resistant dispersant/tungsten oxide particles] was set to 4. Next, toluene was removed from the tungsten oxide particles dispersion liquid (liquid A) by using a spray drier, to thereby obtain the tungsten oxide particle-dispersed powders (abbreviated as powder A hereafter).

The obtained liquid A and a polycarbonate resin pellet, being the thermoplastic resin, were mixed so that $W_{18}O_{49}$ concentration was 2.0 wt %, which were then uniformly mixed by using a blender, and thereafter was melted and kneaded at 290° C. by twin extruding machine. Then, the extruded strand was cut into a pellet shape, to thereby obtain the high heat resistant masterbatch for the heat ray shielding transparent molded resin (abbreviated as masterbatch A hereafter).

The obtained masterbatch A was diluted with the polycarbonate resin pellet (having diameter of 2.5 mm, and length of 3 mm), to thereby obtain $W_{18}O_{49}$ concentration of 03 wt %. The polycarbonate resin diluted material of the masterbatch A was uniformly mixed by a tumbler, which was then extruded and molded into a thickness of 2.0 mm by using the T-die, to thereby obtain the heat ray shielding transparent molded resin according to the example 1, with tungsten oxide particles uniformly dispersed in an entire body of the resin. The dispersion particle diameter of each oxide particle in the heat ray shielding molded resin was 75 nm. When the optical characteristics of the heat ray shielding transparent molded resin according to the example 1 was measured, as shown in table 1, it was found that the solar transmittance was 48.0 and the haze value was 1.1%, at 71.15% of the visible light transmittance.

Example 2

The heat ray shielding transparent molded resin according to example 2 was obtained in the same way as the example 1, other than a point that the masterbatch A was diluted with polycarbonate resin pellet to obtain $W_{18}O_{49}$ concentration of 0.60 wt %. The dispersion particle diameter of each oxide particle in the heat ray shielding resin sheet was 72 nm. When the optical characteristics of the heat ray shielding transparent molded resin according to the example 2 was measured, as shown in table 1, it was found that the solar transmittance was 48.7% and the haze value was 1.2%, at 72.2% of the visible light transmittance.

Example 3

Powders obtained by sufficiently mixing 50 g of $H_2WO_4$ and 17.0 g of $Cs(OH)_2$ (corresponding to Cs/W=0.3) were heated while supplying 5% of $H_2$ gas, with $N_2$ gas as carrier and is subjected to reduction processing for 1 hour at a temperature of 600° C., which was then baked for 30 minutes at 800° C. in $N_2$ gas atmosphere, to thereby obtain particle b (composition formula: $Cs_{0.3}WO_3$, powder color: L* was 35.2745, a* was 1.4918, and b* was −5.3118). Next, 5 wt % of the particles b, 5 wt % of the high heat resistant dispersant α explained in the example 1, 90 wt % of toluene, were weighed, and pulverized/dispersed for 6 hours by a paint shaker, with $\Phi ZrO_2$ beads of 0.3 mm put therein, to thereby prepare the composite tungsten oxide particles dispersion liquid (liquid B). Here, when the dispersion particle diameter of each tungsten oxide particle in the tungsten oxide particles dispersion liquid (liquid B) was measured, the diameter was 75 nm. Further, the high heat resistant dispersant a was added to the liquid B, and was adjusted so that the weight ratio [high heat resistant dispersant/composite tungsten oxide particles] of the high heat resistant dispersant α and the composite tungsten oxide particles was set to 4, then toluene was removed by using a vacuum drier, to thereby obtain the composite tungsten oxide particles dispersion powders (abbreviated as powders B hereafter).

The obtained powders B were added to the polycarbonate resin pellet, being the thermoplastic resin, to thereby obtain 2 wt % of $Cs_{0.3}WO_3$ concentration. Then, the mixture of the powders B and the polycarbonate resin pellet was uniformly mixed by the blender, which was then melted and kneaded by the twin screwing extruder and the extruded strand was cut into a pellet state, to thereby obtain the high heat resistant masterbatch for the composite heat ray shielding transparent molded resin (abbreviated as masterbatch B hereafter).

The masterbatch B was diluted with the polycarbonate resin pellet, so that the $Cs_{0.3}WO_3$ concentration was set to 0.05 wt %. The masterbatch B-diluted material was uniformly mixed by the tumbler and thereafter extruded and molded into a thickness of 2.0 mm by using the T-die, to thereby obtain the heat ray shielding transparent molded resin, with the composite tungsten oxide particles uniformly dispersed in the entire body of the resin. The dispersion particle diameter of the oxide particle in the heat ray shielding molded resin was 72 nm. When the optical characteristics of the heat ray shielding transparent molded resin according to the example 3 were measured, as shown in table 1, the solar transmittance was 37.0% and the haze value was 1.1%, at 71.1% of the visible light transmittance.

Example 4

The high heat resistant masterbatch (abbreviated as masterbatch C hereafter) for the composite heat ray shielding transparent molded resin according to example 4 was prepared in the same way as the example 3, other than a point that acrylic resin was used as the thermoplastic resin, to thereby further obtain the heat ray shielding transparent molded resin. The dispersion particle diameter of the oxide particle in the heat ray shielding molded resin was 87 nm. When the optical characteristics of the heat ray shielding transparent molded resin according to the example 4 was measured, as shown in table 1, the solar transmittance was 38.1% and the haze value was 2.1%, at 72.1% of the visible light transmittance.

Example 5

The high heat resistant masterbatch (abbreviated as masterbatch D hereafter) for the composite heat ray shielding transparent molded resin according to example 5 was prepared in the same way as the example 3 other than a point that polyethylene terephthalate was used as the thermoplastic resin, to thereby obtain the heat ray shielding transparent molded resin. The dispersion particle diameter of the oxide particle in the heat ray shielding molded resin was 73 nm. When the optical characteristics of the heat ray shielding transparent molded resin according to the example 5 were measured, as shown in table 1, the solar transmittance was 37.1% and the haze value was 1.0%, at 71.5% of the visible light transmittance.

Example 6

The high heat resistant masterbatch (abbreviated as masterbatch E hereafter) for the composite heat ray shielding transparent molded resin according to example 6 was obtained in the same way as the example 3 other than a point that ethylene-tetraethylene fluoride copolymer was used as the thermoplastic resin. Next, the masterbatch E was diluted with ethylene-tetraethylene fluoride copolymer pellet, so that $Cs_{0.3}WO_3$ concentration was set to 1 wt %.

The masterbatch E-diluted material was uniformly mixed by the tumbler and extruded and molded into a thickness of 0.1 mm by using the T-die, to thereby obtain the heat ray shielding transparent molded resin, with composite tungsten oxide particles uniformly dispersed in the entire body of the resin. When the optical characteristics of the heat ray shielding transparent molded resin according to the example 6 was measured, as shown in table 1, the solar transmittance was 32.1% and the haze value was 27%, at 60.5% of the visible light transmittance. Note that the haze value shows a high value such as 27%, and this is because the ethylene-tetraethylene fluoride copolymer itself is in a cloudy state, thus making the haze value higher.

Example 7

The high heat resistant masterbatch (abbreviated as masterbatch F hereafter) for the composite heat ray shielding transparent molded resin and the heat ray shielding transparent molded resin according to example 7 were obtained in the same way as the example 6 other than a point that polyethylene resin was used as the thermoplastic resin. The dispersion particle diameter of the oxide particle in the heat ray shielding molded resin was 90 nm. When the optical characteristics of the heat ray shielding transparent molded resin according to the example 7 were measured, as shown in table 1, the solar transmittance was 32.2% and the haze value was 15%, at 61.5% of the visible light transmittance. Note that the haze value shows a high value such as 27%, and this is because the polyethylene resin itself is in a cloudy state, thus making the haze value higher.

Example 8

The high heat resistant masterbatch (abbreviated as masterbatch G hereafter) for the composite heat ray shielding transparent molded resin and the heat ray shielding transparent molded resin according to example 8 were obtained in the same way as the example 3 other than a point that the weight ratio of the high heat resistant dispersant and the composite tungsten oxide particles [high heat resistant dispersant/composite tungsten oxide particles] was set to 0.5. The dispersion particle diameter of the oxide particle in the heat ray shielding molded resin was 86 nm. When the optical characteristics of the heat ray shielding transparent molded resin according to the example 8 was measured, as shown in table 1, the solar transmittance was 36.9% and the haze value was 1.9%, at 70.5% of the visible light transmittance.

Example 9

Methyl-trimethoxysilane was added to the liquid B, and stirred and mixed by a mechanical stirrer for 1 hour, and thereafter toluene was removed by using a spray drier, to thereby obtain the composite tungsten oxide particles (abbreviated as particles c hereafter) to which surface treatment was applied by a silane compound. The high heat resistant masterbatch (abbreviated as masterbatch H hereafter) for the composite heat ray shielding transparent molded resin and the heat ray shielding transparent molded resin according to example 9 was obtained in the same way as the example 3, other than a point that particles c are replaced with particles b. The dispersion particle diameter of the oxide particle in the heat ray shielding molded resin was 90 nm. When the optical characteristics of the heat ray shielding transparent molded resin according to the example 9 were measured, as shown in table 1, the solar transmittance was 38.1% and the haze value was 1.5%, at 72.5% of the visible light transmittance.

Example 10

The high heat resistant masterbatch (abbreviated as masterbatch I hereafter) for the composite heat ray shielding transparent molded resin and the heat ray shielding transparent molded resin according to example 10 were obtained in the same way as the example 3 other than a point that high heat resistant dispersant β (acrylic dispersant having an epoxy group as a functional group, having a thermal decomposition temperature of 270° C. measured by TG-DTA) was used. The dispersion particle diameter of the oxide particle in the heat ray shielding molded resin was 75 nm. When the optical characteristics of the heat ray shielding transparent molded resin according to the example 10 were measured, as shown in table 1, the solar transmittance was 37.1% and the haze value was 1.5%, at 71.3% of the visible light transmittance.

TABLE 1

| | Masterbatch composition | | | | | Transparent resin molded product | | Optical characteristics | | |
|---|---|---|---|---|---|---|---|---|---|---|
| | | Particle | | Dispersant | | | Thickness | Visible | | |
| | Thermoplastic resin | Kind | Concentration (Wt %) | Kind | Weight ratio (*/*) | Particle concentration (Wt %) | of molded product (mm) | light transmittance (%) | Solar transmittance (%) | Haze (%) |
| Example 1 | Polycarbonate | $W_{18}O_{49}$ | 2 | α | 4 | 0.03 | 2.0 | 71.1 | 48 | 1.1 |
| Example 2 | Polycarbonate | $W_{18}O_{49}$ | 2 | α | 4 | 0.6 | 0.1 | 72.2 | 48.7 | 1.2 |
| Example 3 | Polycarbonate | $Cs_{0.3}WO_3$ | 2 | α | 4 | 0.05 | 2.0 | 71.1 | 37 | 1.1 |
| Example 4 | Acryl | $Cs_{0.3}WO_3$ | 2 | α | 4 | 0.05 | 2.0 | 72.1 | 38.1 | 2.1 |
| Example 5 | Polyethylene terephthalate | $Cs_{0.3}WO_3$ | 2 | α | 4 | 0.05 | 2.0 | 71.5 | 37.1 | 1.0 |
| Example 6 | Ethylene-4 fluorine ethylene resinpolyethylene | $Cs_{0.3}WO_3$ | 2 | α | 4 | 1.0 | 0.1 | 60.5 | 32.1 | 27 |

TABLE 1-continued

| | Masterbatch composition | | | | | Transparent resin molded product | | Optical characteristics | | |
|---|---|---|---|---|---|---|---|---|---|---|
| | | Particle | | Dispersant | | | Thickness | Visible light | | |
| | Thermoplastic resin | Kind | Concentration (Wt %) | Kind | Weight ratio (*/*) | Particle concentration (Wt %) | of molded product (mm) | transmittance (%) | Solar transmittance (%) | Haze (%) |
| Example 7 | Polyethylene | $Cs_{0.3}WO_3$ | 2 | α | 4 | 1.0 | 0.1 | 61.5 | 33.2 | 15 |
| Example 8 | Polycarbonate | $Cs_{0.3}WO_3$ | 2 | α | 0.5 | 0.05 | 2 | 70.5 | 36.9 | 1.9 |
| Example 9 | Polycarbonate | *$Cs_{0.3}WO_3$ | 2 | α | 4 | 0.05 | 2 | 72.5 | 38.1 | 1.5 |
| Example 10 | Polycarbonate | $Cs_{0.3}WO_3$ | 2 | β | 4 | 0.05 | 2 | 71.3 | 37.1 | 1.5 |

Wherein, (*/*) means (blending weight of α or β)/(blending weight of $W_{18}O_{49}$ or $Cs_{0.3}WO_3$). ($Cs_{0.3}WO_3$: $Cs_{0.3}WO_3$ is subjected to surface treatment by a silane compound)

(α: Acrylic dispersant having a hydroxyl group as a functional group, having a thermal decomposition temperature of 250° C.)

(β: Acrylic dispersant having an epoxy group as a functional group, having a thermal decomposition temperature of 270° C.)

Comparative Example 1

The high heat resistant masterbatch (abbreviated as masterbatch J hereafter) for the composite heat ray shielding transparent molded resin and the heat ray shielding transparent molded resin according to comparative example 1 were obtained in the same way as the example 3 other than a point that ordinary dispersant γ (polyether-based dispersant having an amine group as the functional group, having the thermal decomposition temperature of 210° C. measured by TG-DTA) was used. The dispersion particle diameter of the oxide particle of the heat ray shielding molded resin was 78 nm. When the optical characteristics of the heat ray shielding transparent molded resin according to the comparative example 1 were measured, as shown in table 1, the solar transmittance was 34.1% and the haze value was 1.8%, at 55.6% of the visible light transmittance. The visible light transmittance was low and therefore the heat ray shielding characteristics specific to the composite tungsten oxide particles could not be obtained. Further, the dispersant was thermally decomposed during melting and kneading, due to the use of the dispersant not having high heat resistance, then the obtained heat ray shielding molded resin was colored brown, and a color tone specific to the composite tungsten oxide particles could not be obtained.

Comparative Example 2

The high heat resistant masterbatch (abbreviated as masterbatch K hereafter) for the composite heat ray shielding transparent molded resin and the heat ray shielding transparent molded resin according to comparative example 2 were obtained in the same way as the example 3 other than a point that the weight ratio of the high heat resistant dispersant and the composite tungsten oxide particles [high heat resistant dispersant/composite tungsten oxide particles] was set to 0.4. The dispersion particle diameter in the heat ray shielding resin molded product was 300 to 500 nm, and the oxide particles were agglomerated. When the optical characteristics of the heat ray shielding transparent molded resin according to the comparative example 2 were measured, as shown in table 2, it was found that the solar transmittance was 65.9% and the haze value was 16.7% at 78.5% of the visible light transmittance. The reason therefore is considered as follows: the weight ratio of the high heat resistant dispersant and the composite tungsten oxide particles [high heat resistant dispersant/composite tungsten oxide particles] was set to 0.4 and an amount of the dispersant was insufficient, thus making it impossible to sufficiently disperse the tungsten oxide particles, and therefore agglomeration of the particles occurs, and sufficient optical characteristics can not be obtained. Further, the haze value was also high, and transparency specific to the polycarbonate resin was damaged.

Comparative Example 3

The high heat resistant masterbatch (abbreviated as masterbatch L hereafter) for the composite heat ray shielding transparent molded resin and the heat ray shielding transparent molded resin according to comparative example 3 were obtained in the same way as the example 2 other than a point that the weight ratio of the high heat resistant dispersant and the composite tungsten oxide particles [high heat resistant dispersant/composite tungsten oxide particles] was set to 11. The dispersion particle diameter of the oxide particle in the heat ray shielding molded product was 79 nm. When the optical characteristics of the heat ray shielding transparent molded resin according to the comparative example 3 were measured, as shown in table 2, it was found that the solar transmittance was 49.0% and the haze value was 1.4% at 72.7% of the visible light transmittance. However, it was found that a surface strength of the obtained heat ray shielding molded product was extremely lowered because the weight ratio of the high heat resistant dispersant and the composite tungsten oxide particles [high heat resistant dispersant/composite tungsten oxide particles] was 11, with excessive amount of the dispersant, and therefore the surface is easily damaged only by being scratched by nails.

TABLE 2

| | Masterbatch composition | | | Dispersant | | Transparent resin molded product | | Optical characteristics | | |
|---|---|---|---|---|---|---|---|---|---|---|
| | Thermoplastic resin | Particle Kind | Particle Concentration (Wt %) | Kind | Weight ratio (*/*) | Particle concentration (Wt %) | Thickness of molded product (mm) | Visible light transmittance (%) | Solar trans-mittance (%) | Haze (%) |
| Com* example 1 | Polycarbonate | $Cs_{0.3}WO_3$ | 2 | γ | 4 | 0.05 | 2.0 | 55.6 | 34.1 | 1.8 |
| Com* example 2 | Polycarbonate | $Cs_{0.3}WO_3$ | 2 | α | 0.4 | 0.05 | 2.0 | 78.5 | 65.9 | 16.7 |
| Com* example 3 | Polycarbonate | $W_{18}O_{49}$ | 2 | α | 11 | 0.6 | 0.1 | 72.7 | 49 | 1.4 |

Wherein,
(*/*) means (blending weight of α or β)/(blending weight of $W_{18}O_{49}$ or $Cs_{0.3}WO_3$).
($Cs_{0.3}WO_3$: $Cs_{0.3}WO_3$ is subjected to surface treatment by a silane compound)
(α: Acrylic dispersant having a hydroxyl group as a functional group, having a thermal decomposition temperature of 250° C.)
(γ: Polyether-based dispersant having an amine group as a functional group, having a thermal decomposition temperature of 210° C.)
Com* . . . Comparative

The invention claimed is:

1. A high heat resistant masterbatch, which is used for manufacturing a heat ray shielding transparent molded resin, comprising:
 a thermoplastic resin;
 composite tungsten oxide particles expressed by a general formula $M_YWO_Z$ (satisfying $0.1 \leq Y \leq 0.5$, $2.2 \leq Z \leq 3.0$, and element M is at least one member selected from the group consisting of Cs, Rb, K, Tl, In, Ba, Li, Ca, Sr, Fe, Sn, Al, and Cu) and having a crystal structure of hexagonal crystal; and
 a high heat resistant dispersant having an acryl main chain and a hydroxyl group or an epoxy group, and having a thermal decomposition temperature of 230° C. or more, satisfying a range of $10 \geq$ [weight of the high heat resistant dispersant/(weight of composite tungsten oxide particles)]$\geq 0.5$.

2. The high heat resistant masterbatch according to claim 1, wherein the thermoplastic resin is at least one member selected from the group consisting of acrylic resin, polycarbonate resin, polystyrene resin, polyethersulfone resin, fluorine based resin, and polyolefin resin.

3. The high heat resistant masterbatch according to claim 1, wherein the composite tungsten oxide particles are particles, each having a dispersion particle diameter of 200 nm or less.

4. The high heat resistant masterbatch according to claim 1, wherein the composite tungsten oxide particles are subjected to surface treatment by a compound of at least one member selected from the group consisting of a silane compound, a titanium compound, and a zirconia compound.

5. A heat shielding transparent resin molded product, wherein the high heat resistant masterbatch according to claim 1 is mixed with the same kind of thermoplastic resin as the thermoplastic resin contained in the high heat resistant masterbatch, or a different kind of thermoplastic resin having compatibility with the thermoplastic resin contained in the high heat resistant masterbatch, and is molded into a prescribed shape.

6. A heat ray shielding transparent lamination body, wherein the heat ray shielding transparent molded resin according to claim 5 is laminated on other transparent molded product.

* * * * *